US010232437B1

(12) United States Patent
Yavari et al.

(10) Patent No.: US 10,232,437 B1
(45) Date of Patent: Mar. 19, 2019

(54) METHOD AND SYSTEM OF METALLIC PART FABRICATION

(71) Applicants: Parviz Yavari, Huntington Beach, CA (US); Mahdi Yoozbashizadeh, Long Beach, CA (US)

(72) Inventors: Parviz Yavari, Huntington Beach, CA (US); Mahdi Yoozbashizadeh, Long Beach, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 15/590,832

(22) Filed: May 9, 2017

(51) Int. Cl.
| | |
|---|---|
| *B22F 3/00* | (2006.01) |
| *B22F 3/02* | (2006.01) |
| *B22F 3/04* | (2006.01) |
| *B22F 3/12* | (2006.01) |
| *B22F 3/15* | (2006.01) |
| *B33Y 10/00* | (2015.01) |
| *B22F 1/00* | (2006.01) |
| *B22F 3/10* | (2006.01) |
| *B22F 5/00* | (2006.01) |

(52) U.S. Cl.
CPC .............. *B22F 3/008* (2013.01); *B22F 1/007* (2013.01); *B22F 3/1021* (2013.01); *B22F 3/15* (2013.01); *B22F 3/00* (2013.01); *B22F 3/02* (2013.01); *B22F 3/04* (2013.01); *B22F 3/10* (2013.01); *B22F 3/1007* (2013.01); *B22F 3/12* (2013.01); *B22F 5/00* (2013.01); *B22F 2201/10* (2013.01); *B22F 2201/20* (2013.01); *B33Y 10/00* (2014.12)

(58) Field of Classification Search
None
See application file for complete search history.

(56) References Cited

U.S. PATENT DOCUMENTS

| | | | | |
|---|---|---|---|---|
| 3,201,236 A | * | 8/1965 | Hill | .......................... B22F 3/26 |
| | | | | 419/19 |
| 6,508,980 B1 | * | 1/2003 | Sachs | .................... B22F 1/0059 |
| | | | | 419/26 |
| 2004/0018107 A1 | * | 1/2004 | Khoshnevis | ............ B22F 3/008 |
| | | | | 419/6 |

OTHER PUBLICATIONS

Ferguson and German. Powder Shaping and Consolidation Technologies. ASM Handbook. vol. 7. 1998, pp. 313-320. (Year : 1998).*

* cited by examiner

*Primary Examiner* — Paul A Wartalowicz
*Assistant Examiner* — Stephani Hill
(74) *Attorney, Agent, or Firm* — Tarolli, Sundheim, Covell & Tummino LLP

(57) ABSTRACT

A method of metallic part fabrication includes loose metal powder spread over an additive manufacturing build tank. A fluid binder/ceramic agent solution is selectively deposited upon a predetermined portion of the loose metal powder to create a printed layer. The printed layer is dried to remove a portion of the fluid binder/ceramic agent solution from the printed layer, to create a dried layer. A plurality of dried layers is stacked longitudinally to create a green part. The green part is bulk sintered to create a metallic part with uniformly dispersed and distributed ceramic particles in the metal matrix. A system for metallic part fabrication is also provided.

14 Claims, 6 Drawing Sheets

METHOD AND SYSTEM OF METALLIC PART FABRICATION

TECHNICAL FIELD

This disclosure relates to a system and method for metallic part fabrication and, more particularly, to a method and system for metal-matrix part fabrication using additive manufacturing.

BACKGROUND

Very limited knowledge of the manufacturing of metal-matrix composite structures using rapid prototyping techniques currently exists. Two main approaches are known in the art for manufacturing of metal-matrix/ceramic composites. The first approach uses the direct sintering of metal/ceramic powders, and the second approach relies on the production of a three-dimensional ceramic preform followed by liquid infiltration of metals into the preform using high-pressure infiltration techniques.

Selective laser sintering ("SLS") is an additive manufacturing technique that uses a laser as the power source to sinter powdered material (typically metal), aiming the laser automatically at points in space defined by a 3D model, binding the material together to create a solid structure. It is similar to direct metal laser sintering ("DMLS"); the two are instantiations of the same concept but differ in technical details. Selective laser melting ("SLM") uses a comparable concept, but in SLM the material is fully melted rather than sintered. Any of these examples of the first approach, above, result in a high level of porosity within the sintered material, high internal stresses developed during the rapid prototyping process, and low speed of manufacturing (layer-by-layer deposition of materials) compared to the metal infiltration technique (the second approach, above). Although the second approach may thus be more useful than the first approach, this second technique is only applicable to a limited number of metallic materials.

In addition, the metal infiltration process (the second approach) requires the presence of interconnected pores within the ceramic preform. However, such pores are not readily achievable for complex geometries, and that unavailability of pores inversely affects the homogeneity of the mixture and the properties of the resulting metal-matrix composite. In addition, the second approach is accomplished in two separate and potentially involved steps, thus negatively influencing the time and cost efficiencies of manufacturing.

SUMMARY

In an embodiment, a method of metallic part fabrication is described. Loose metal powder is spread over an additive manufacturing build tank. A fluid binder/ceramic agent solution is selectively deposited upon a predetermined portion of the loose metal powder to create a printed layer. The printed layer is dried to remove a portion of the fluid binder/ceramic agent solution from the printed layer, to create a dried layer. A plurality of dried layers is stacked longitudinally to create a green part. The green part is bulk sintered to create a metallic part.

In an embodiment, a system for metallic part fabrication is described. A supply of loose metal powder is provided. A supply of fluid binder/ceramic agent solution is provided, the fluid binder/ceramic agent solution including at least one inorganic salt carried by a fluid carrier. An additive manufacturing machine is provided for selectively depositing fluid binder/ceramic agent solution upon a predetermined portion of the loose metal powder. A dryer is provided to remove the fluid carrier from the loose metal powder, once the fluid binder/ceramic agent solution is deposited on the loose metal powder. A sintering oven is provided for bulk sintering a green part comprised of a plurality of laminated layers of loose metal powder with relative positional integrity maintained by crystals formed at least partially of the inorganic salt. The green part is bulk sintered into a metallic part including a plurality of ceramic particles, created by decomposition of inorganic salts during sintering, distributed evenly throughout a metal matrix.

BRIEF DESCRIPTION OF THE DRAWINGS

For a better understanding, reference may be made to the accompanying drawings, in which.

DESCRIPTION OF ASPECTS OF THE DISCLOSURE

This technology comprises, consists of, or consists essentially of the following features, in any combination.

Figure 1A:
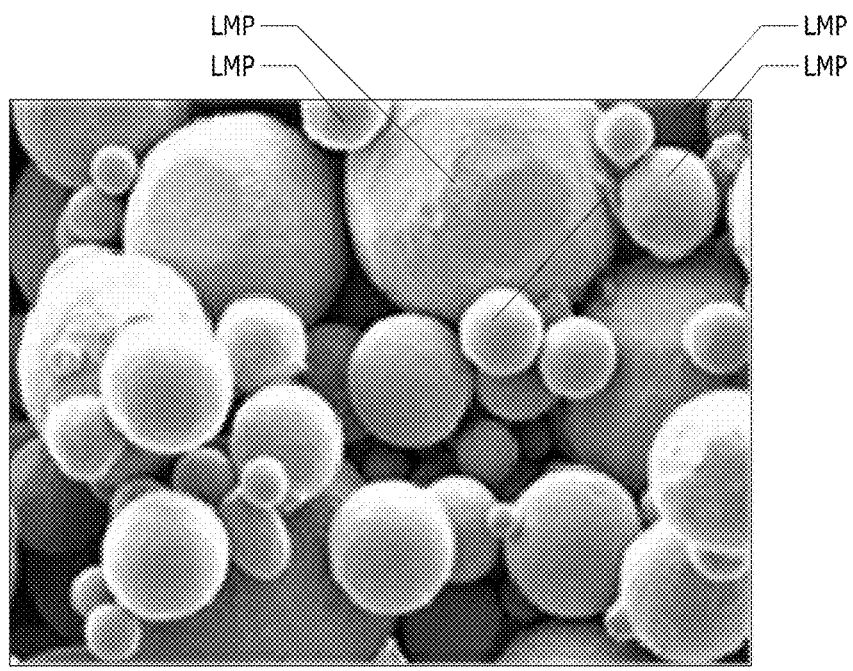
FIGS. 1A-1D depict various scanning electron microscope images of materials made with and without aspects of the invention.
Figure 1B:
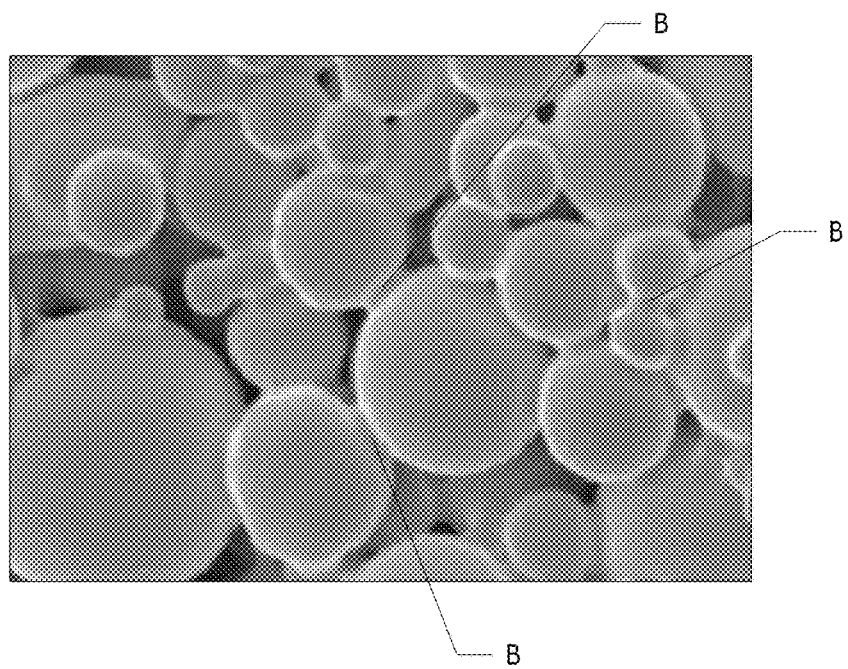
Figure 1C:
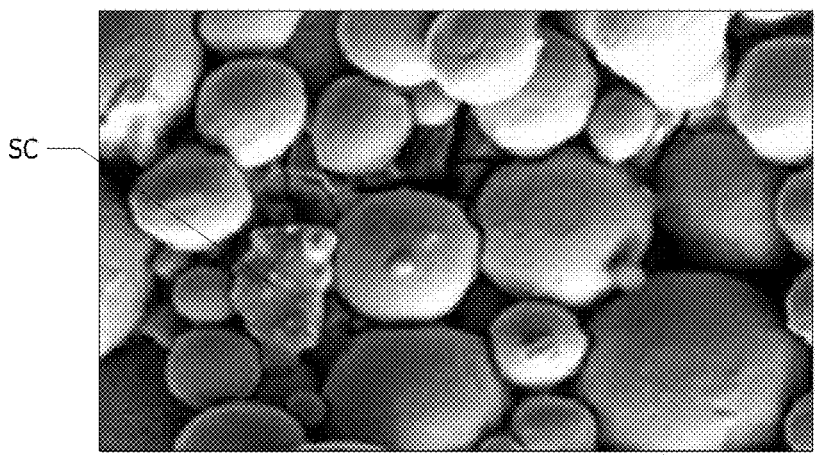
Figure 1D:
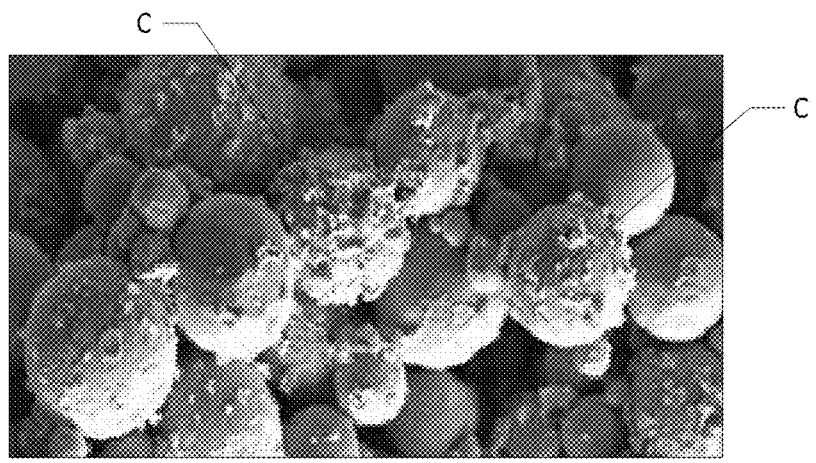

FIGS. 1A-1D are a series of scanning electron microscope micrographs of the molecular structure of materials made in various manners, and at various points in the manufacturing process. FIG. 1A depicts the molecular structure of a material which is made of loose metallic powder (LMP), before sintering (heating). FIG. 1B is an image of the material of FIG. 1A after sintering, showing the bonds (B) that form between the particles during the sintering process. FIG. 1C shows the metal powder material of FIG. 1A, with the addition of salt crystals (SC) before sintering. FIG. 1D depicts the material of FIG. 1C after sintering, where the heat has caused the salt crystals to reform into a ceramic (C), distributed throughout the bonded-together metal powder particles.

Figure 2A:
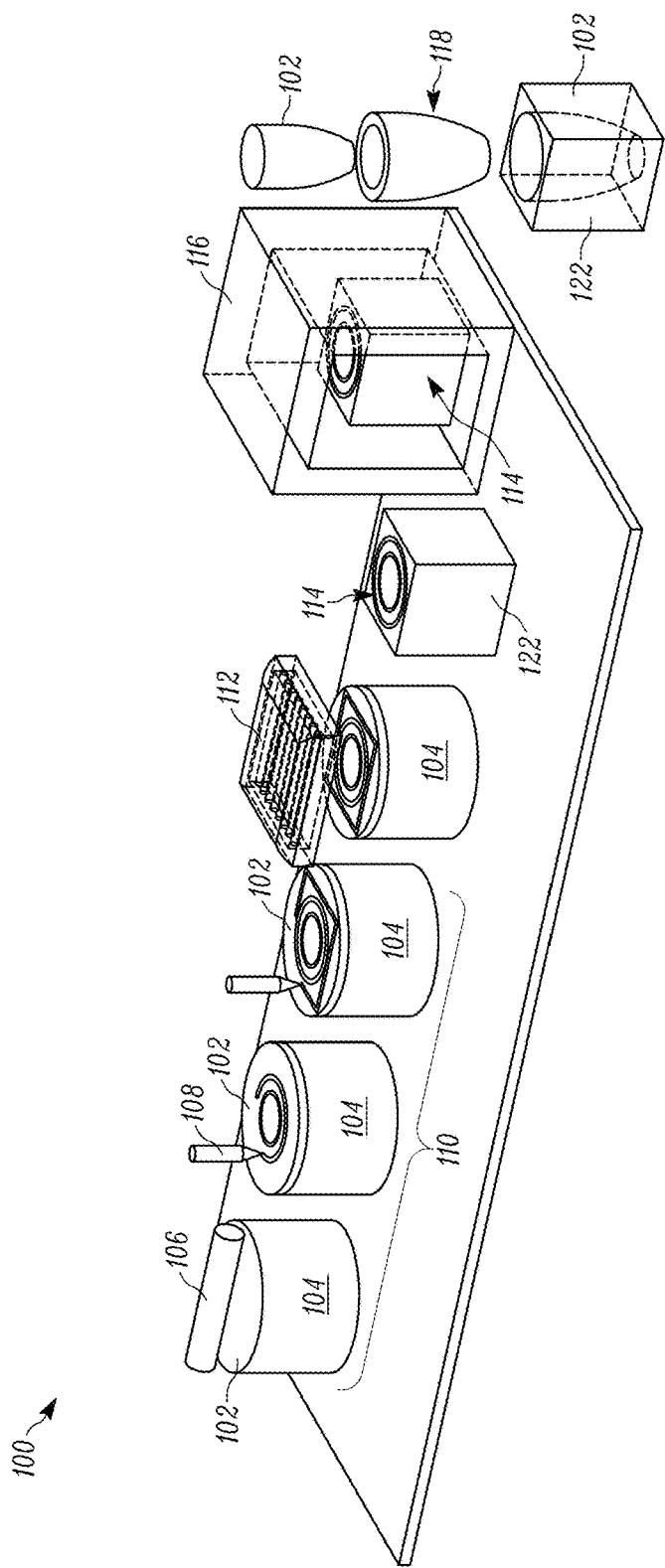
FIG. 2A is a schematic diagram of a system of an aspect of the invention.

FIG. 2A schematically depicts a system 100 of metallic part fabrication and, in particular, for generating metal matrix composite ("MMC") materials having uniformly distributed and dispersed ultra-fine ceramic particles within a metal substrate, using an additive manufacturing process (commonly known as "3D printing", hereafter "AM"). In FIG. 2A, the various parts of the MMC fabrication process are shown schematically as taking place at different "stations" (in sequence from left to right, in the orientation of FIG. 2A), but one of ordinary skill in the art will understand that the system 100 would instead likely use suitable machines and manufacturing configurations to perform one or more parts of the MMC fabrication process at a single station or using a single machine. FIGS. 2C-2D provide detail views at certain aspects of the system 100 of FIG. 2A.

The system 100 includes a supply of loose metal powder 102. The loose metal powder 102 can be, for example, mixed or partially alloyed bronze, fully alloyed 325 mesh anneal bronze, bronze and titanium, or any other desired material or combination of materials. Here, the loose metal powder 102 is shown as being spread across a build tank 104 (known in the art of AM), with a roller 106 or blade being used to re-spread loose metal powder 102 for a fresh start to each laminated layer as the build tank 104 platform moves downward (for example, by translating vertically about 0.1-0.5 mm for each layer, as desired for a particular use application) over the course of the build process.

The system 100 also includes a supply of fluid binder/ceramic agent solution (shown schematically at 108), which acts as both a binding agent and a ceramic agent. The fluid binder/ceramic agent solution 108 may include at least one inorganic salt carried by a fluid carrier. For example, the inorganic salt could include aluminum sulfate, zirconium sulfate, magnesium sulfate, zinc sulfate, sucrose, or any other material or combination of materials, placed into solution in water, acetone, alcohol, or any other fluid carrier (s) to create the fluid binder/ceramic agent solution 108. For many use applications, the inorganic salt of the fluid binder/ceramic agent solution 108 can be chosen using factors such as, but not limited to, solubility of the inorganic salt, a decomposition temperature lower than the sintering temperature, molecular mass weight and surface tension for proper penetration into the loose metal powder 102, type and composition of the compounds after decomposition.

Figure 2B:
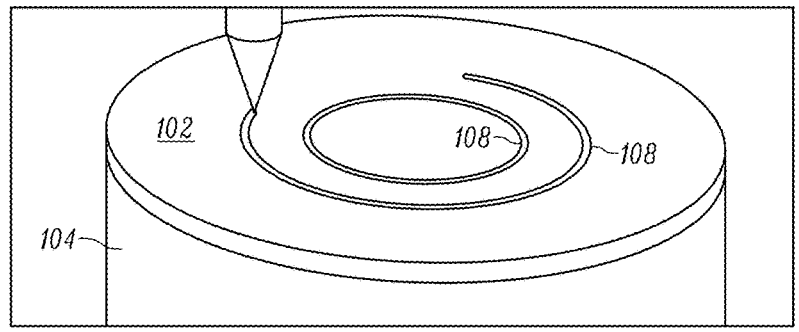
FIGS. 2B-2D are detail views corresponding to portions of the schematic view of FIG. 2A.
Figure 2C:
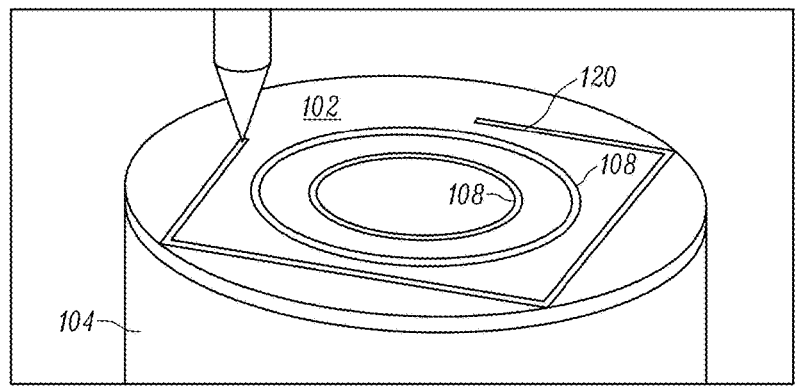
Figure 2D:
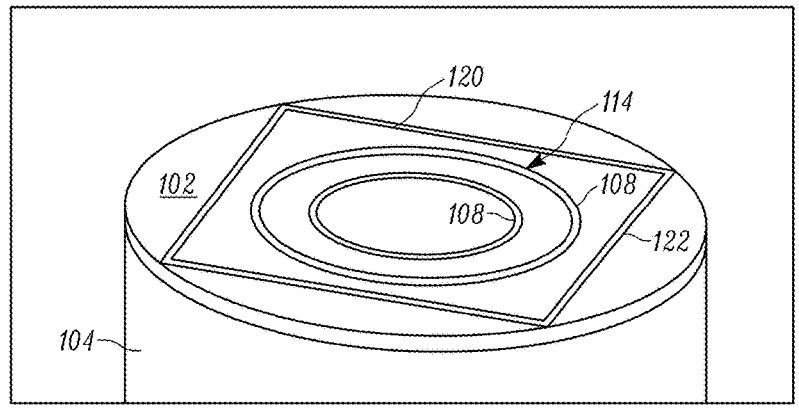

An additive manufacturing machine (collectively shown as 110 in FIG. 2A) is provided for selectively depositing the fluid binder/ceramic agent solution 108 upon a predetermined portion of the loose metal powder 102, as shown in FIG. 2B. For example, the fluid binder/ceramic agent solution 108 could be sprayed or released from a nozzle onto the loose metal powder 102 spread across a top surface of the build tank 104. Suitable nozzles could include, but are not limited to, a single print nozzle, solenoid valve (e.g., with an orifice size of about 0.005" [0.127 mm]) or an inkjet printhead. A dryer 112 may be provided to help remove the fluid carrier from the loose metal powder 102 via convection or heat-assisted evaporation, once the fluid binder/ceramic agent solution 108 is deposited on the loose metal powder 102. The fluid carrier could also or instead be removed from the loose metal powder 102 by evaporative drying into the ambient space, without added heat or convection. The dryer 112 could be used individually on each layer, before spreading of the loose metal powder 102 for the next layer, or could be used to bulk-dry a multiple-laminated-layer construct. The dryer 112, for example, could heat each layer up to approximately 110° C. to dry up the fluid carrier, leaving the inorganic salt in place.

A compressor (not shown), which could be a hot isostatic press, may be used as desired for selectively compressing at least a portion of the loose metal powder 102 making up the laminated layers. For example, the compressor could be used individually on each layer, before spreading of the loose metal powder 102 for the next layer, or could be used to bulk-compress a multiple-laminated-layer construct.

The drying process (whether naturally dried or assisted with dryer 112) will leave an inorganic salt from the fluid binder/ceramic agent solution 108 behind on the loose metal powder 102. For most use environments of the present invention, the presence of the inorganic salt will serve to "bind" the loose metal powder 102 together sufficiently that a "green" (i.e., unfinished) part 114 created by the AM of the inorganic salt and loose metal powder 102 has some degree of positional integrity and can be carefully handled and moved for further processing. This green part 114, at such an intermediate processing stage, can be thought of as being analogous to a sand castle, in which the sand is partially adhered together (at least sufficiently to hold an imposed shape) by salt particles from evaporated seawater, even though the sand itself is substantially "dried" from the seawater. When a compressor is provided, some degree of positional integrity could also or instead be provided to the layers of the green part 114 through compression and mechanical "packing", to assist with holding the shape integrity of the green part 114.

A sintering oven 116 is provided for bulk sintering the green part 114, which is comprised of a plurality of laminated layers of loose metal powder 102 with relative positional integrity maintained by the inorganic salt. The bulk sintering described here fuses or melts the loose metal powder 102 of all layers of the green part 114 at one time, as opposed to the layer-by-layer sintering of the prior art SLS and related processes. Using the sintering oven 116, the green part 114 is bulk sintered into a metallic part 118 including a plurality of ceramic particles, created by decomposition of the inorganic salt, distributed evenly throughout a metal matrix. (This finished metallic part 118 MMC material is shown in FIG. 1D.) For example, the sintering oven 116 can provide an inert environment with argon gas or under high vacuum, such as about 0.001 Torr.

In FIG. 2A, the green part 114 is shown as being included in a cube-shaped construct including both loose metal powder 102 which includes inorganic salts from the printed-on fluid binder/ceramic agent solution 108 (i.e., the portions seen as concentric circles at the top of the cube), as well as some portion of loose metal powder 102 which does not include the inorganic salts, but is held together by, for example, compression. FIG. 2A is a schematic view, and it should be understood that the product of the AM (the cube-shaped structure, as shown in FIG. 2), which is then sintered in the sintering oven 116 could strictly be the green part 114—comprised of loose metal powder 102 including inorganic salts from the printed-on fluid binder/ceramic agent solution 108—or could, as shown by the cube-shaped structure in FIG. 2A, include some amount of loose metal powder 102 which does not include inorganic salts. One of ordinary skill in the art will understand that the loose metal powder 102 which does not include inorganic salts can be removed from the green part 114 before or after the sintering process, as desired. (In the latter case, removal after sintering, it is contemplated that sintering characteristics such as temperature or pressure could be selected to facilitate removal of the loose metal powder 102 from the then-sintered green part 114.)

In use of the system 100 of FIG. 2A, a boundary binding solution 120, which could be the same as, or different than, the fluid binder/ceramic agent solution 108, can be selectively deposited across the surface of each loose metal powder 102 layer in order to create an enclosing boundary frame 122 (which can also be characterized as a perimeter or wall) around the green part 114 as each successive laminated layer is built up around the green part 114. This boundary frame 122 process is shown in FIGS. 2C-2D. For example, the boundary binding solution 120 could be an adhesive or otherwise configured to make the frame 122 fairly strongly bound, as opposed to the relatively weak inorganic salt binding of the green part 114. The frame 122 can thus be used to contain loose metal powder 102 in the volume of space between the frame 122 and the green part 114, as shown by the "box" type cube-shaped construct in FIG. 2A.

This contained loose metal powder 102 (not to be confused with the former loose metal powder 102 that has been bound into the green part 114) could assist with physically cradling and supporting the structures of the green part 114 during moving and processing. When present, the frame 122 and the loose metal powder 102 contained therein could be removed from the green part 114 before, during, or after (as shown in FIG. 2A) the bulk sintering stage of the system 100 occurs, as previously discussed.

As alluded to above, when the frame 122 and/or the loose metal powder 102 are bulk sintered along with the green part 114, it is contemplated that some physical or chemical property of the frame 122 and/or the loose metal powder 102 differs sufficiently from a corresponding physical or chemical property of the green part 114 so that the frame 122 and loose metal powder 102 can still be removed from the metallic part 118 (as shown in FIG. 2), and do not simply fuse into a block around the metallic part 118. For example, it is contemplated that the sintering temperature could be chosen to avoid fusing the loose metal powder 102, so that the loose metal powder 102 falls away from the metallic part 118 upon removal of the frame 122.

Figure 3:
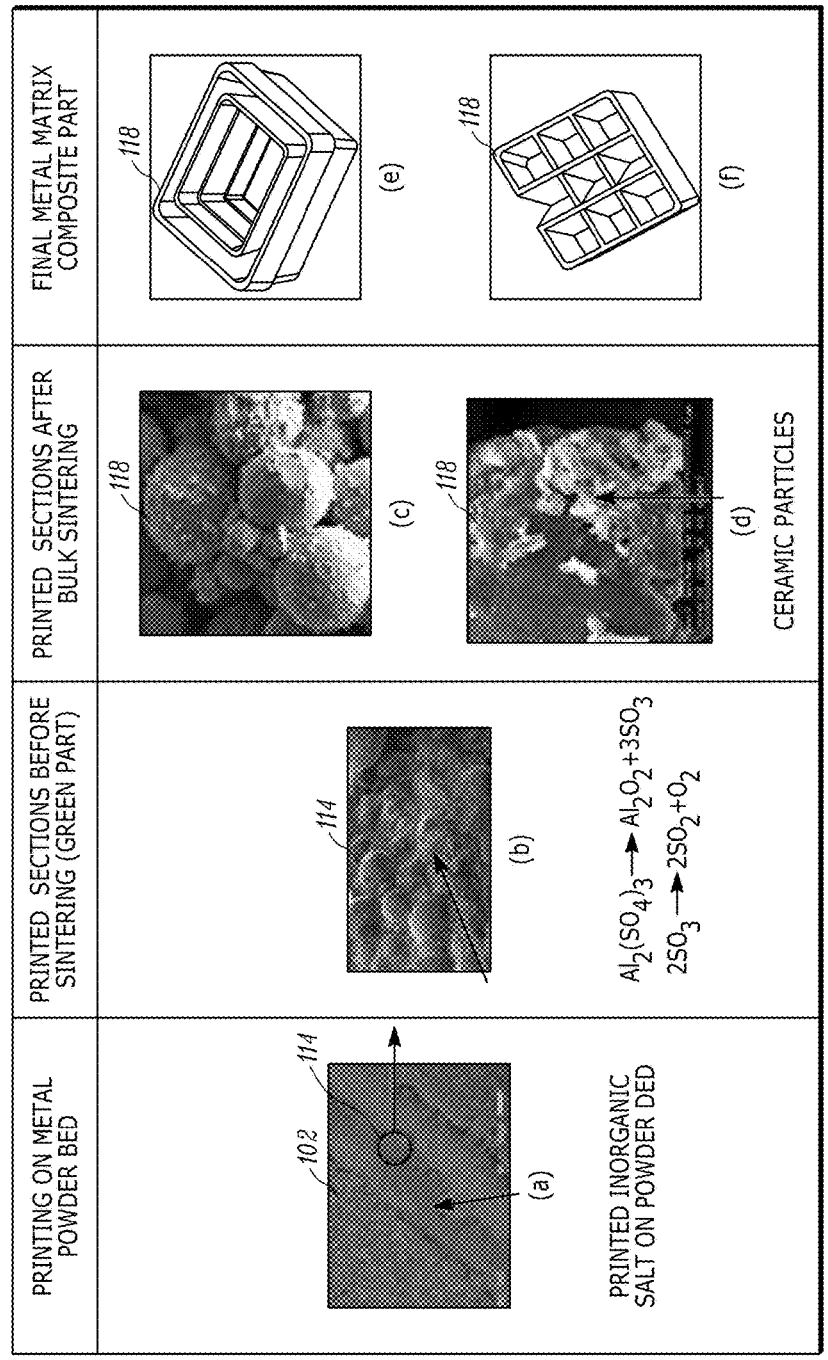
FIG. 3 depicts various views of intermediate products throughout the use of the system of FIG. 2A.

FIG. 3 visually depicts the products of the system 100 at various points during processing. Image (a) of FIG. 3 shows the inorganic salt printed/deposited onto the loose metal powder 102. Image (b) then is a magnified (scanning electron microscope) view of the circled area of Image (a), showing the structure of the green part 114. Images (c) and (d) of FIG. 3 are magnified images showing the structure of the metallic part 118, whereas Images (e) and (f) show completed whole metallic parts 118 and display the relatively complex MMC shapes that the system 100 can produce.

Figure 4:
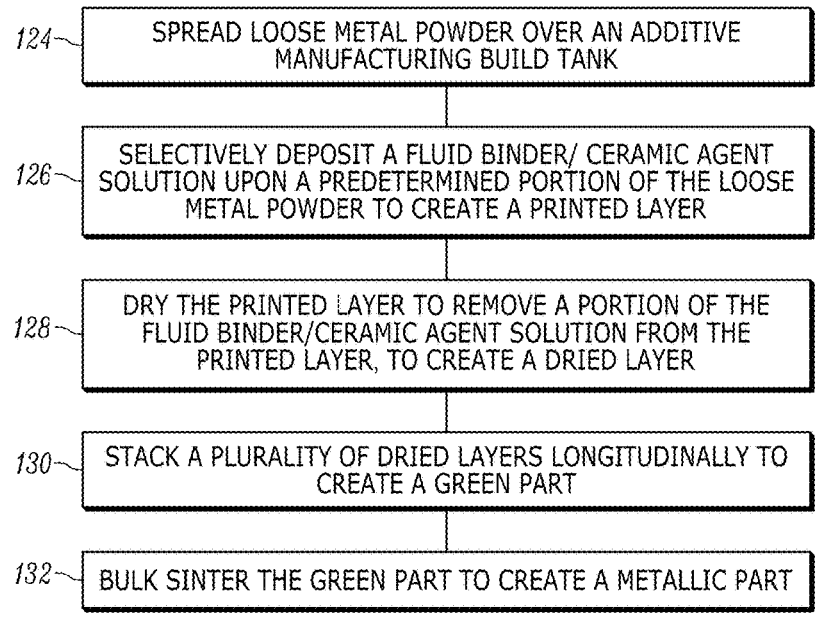
FIG. 4 schematically depicts a method of using the system of FIG. 2A.

FIG. 4 is a flowchart of a method of metallic part fabrication using the system 100 described above and shown in FIG. 2A. In first action block 124, loose metal powder 102 is spread over an AM build tank 104. The AM build tank 104 may contain at least a previously created one of a printed layer and a dried layer, as will be discussed below.

In second action block 126, then, a fluid binder/ceramic agent solution 108 is selectively deposited upon a predetermined portion of the loose metal powder 102 to create a printed layer. During this second action block 126, the fluid binder/ceramic agent solution 108 can be selectively deposited upon a predetermined portion of the loose metal powder 102 to create, as a component of the printed layer, a boundary frame 122 around at least a portion of the periphery of a remaining (i.e., also printed) portion of the printed layer. This printed layer can be characterized as one of the laminated layers that will eventually make up the green part 114, as will be understood by one of ordinary skill in the art of AM.

The method shown in FIG. 4 then progresses to third action block 128, where the printed layer is dried to remove a portion of the fluid binder/ceramic agent solution 108 from the printed layer, to create a dried layer. For example, drying the printed layer can include heating the printed layer to evaporate at least a portion of the fluid binder/ceramic agent solution 108 from the printed layer.

Stated differently, in third action block 128, when the fluid binder/ceramic agent solution 108 includes at least one inorganic salt carried by a fluid carrier, then drying the printed layer can include evaporating the fluid carrier to leave the inorganic salt behind upon the loose metal powder 102. The remaining portion of the fluid binder/ceramic agent solution left behind after the removed portion of the fluid binder/ceramic agent solution is removed, may help maintain positional integrity of the loose metal powder 102 forming the dried layer. For example, the inorganic salt left behind when the fluid binder is evaporated may help maintain positional integrity of the loose metal powder 102 forming the dried layer.

The method of FIG. 4 then progresses on to fourth action block 130, where a plurality of dried layers are stacked longitudinally to create a green part 114. This could be accomplished, for example, by looping back through first through third action blocks 124-128 multiple times in a known AM manner. At one of the printed layer, the dried layer, and the green part 114 could be compressed, such as by hot isostatic pressing, during creation of the metallic part 118. This compression could occur, for example, at some time during the sequence of second to fourth action blocks 126 and 130.

Figure 5:
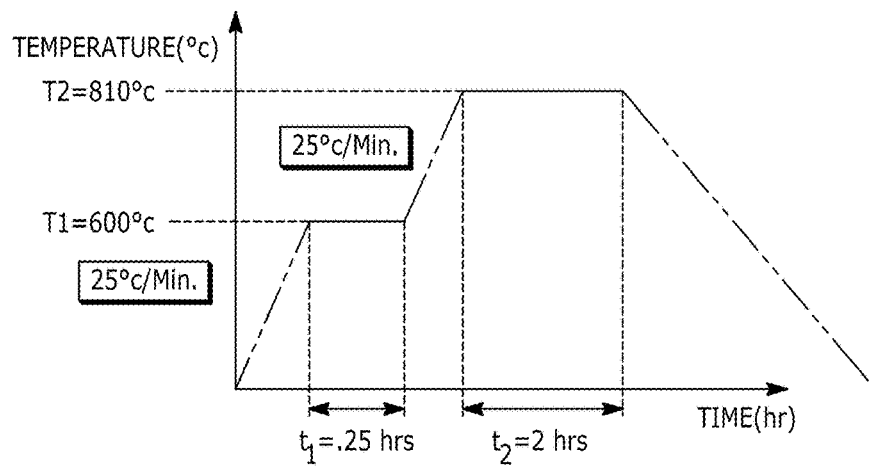
FIG. 5 is an example sintering time and sintering temperature chart of a portion of a process using the system of FIG. 2A.

After fourth action block 130, the green part 114 is bulk sintered to create a metallic part 118 in fifth action block 132. FIG. 5 is a graph showing an example of a suitable bulk sintering time/temperature chart for bronze-alumina composite, with the green part 114 being sintered at about 600° C. for about fifteen minutes, increased to 810° C. for about two hours, and then slowly cooled. One of ordinary skill in the art could readily specify a suitable sintering procedure for a particular use environment of the system 100, taking into account factors such as the materials involved, the ambient sintering atmospheric conditions, the sintering and decomposition reactions desired, and any other factors. The metallic part 118 includes a plurality of ceramic particles distributed evenly throughout a metal matrix as a result of the sintering process, and is thus considered to be made of an MMC material. The inorganic salt is sintered down to become the ceramic, undergoing decomposition during the sintering process from inorganic salt into ceramic particles.

At least one of the boundary frame 122, when provided, and loose metal powder 102 adjacent to the remaining portion (i.e, the "printed" area) of the dried layer can be removed from the remaining portion of at least one dried layer before bulk sintering of the green part 114—thus, between the third and fourth action blocks 128 and 130. Alternatively, the boundary frame 122 and/or some portion of adjacent loose metal powder 102 could be at least partially sintered along with the green part 114.

Alternatively, during or after the deposition of the fluid binder/ceramic agent solution 108 in the second action block 126, a separate printed-layer-sintering process could be completed (similar to current SLS and related methods), in order to provide desired properties to the green part 114 and/or the metallic part 118, or even to assist with providing a robust boundary frame 122.

While aspects of this disclosure have been particularly shown and described with reference to the example embodiments above, it will be understood by those of ordinary skill in the art that various additional embodiments may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking aiding a user in selecting one component from an array of similar components for a particular use environment. A "predetermined" status may be determined at any time before the structures being manipulated actually reach that status, the "predetermination" being made as late as immediately before the structure achieves the predetermined status. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one embodiment or configuration could be provided, singly or in combination with other structures or features, to any other embodiment or configuration, as it would be impractical to describe each of the embodiments and configurations discussed herein as having all of the options discussed with respect to all of the other embodiments and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

We claim:

1. A method of metallic part fabrication, the method comprising:
   spreading loose metal powder over an additive manufacturing build tank;
   providing a solution comprising a fluid binder and a ceramic agent, the ceramic agent comprising an inorganic salt;
   selectively depositing the solution upon a predetermined portion of the loose metal powder to create a printed layer;
   drying the printed layer to remove a portion of the solution from the printed layer, to create a dried layer;
   stacking a plurality of dried layers longitudinally to create a green part; and
   bulk sintering the green part to create a metallic part including a plurality of ceramic particles distributed through a metal matrix comprised of a melted or sintered form of the loose metal powder.

2. The method of claim 1, including compressing at least one of the printed layer, the dried layer, and the green part during creation of the metallic part.

3. The method of claim 2, including hot isostatic pressing at least one of the printed layer, the dried layer, and the green part during creation of the metallic part.

4. The method of claim 1, wherein a remaining portion of the solution, left behind after the portion of the solution is removed, maintains positional integrity of the loose metal powder forming the dried layer.

5. The method of claim 1, wherein the solution includes at least one inorganic salt carried by a fluid carrier, and drying the printed layer includes evaporating the fluid carrier to leave the inorganic salt behind upon the loose metal powder.

6. The method of claim 5, wherein the inorganic salt left behind maintains positional integrity of the loose metal powder forming the dried layer.

7. The method of claim 1, wherein drying the printed layer includes heating the printed layer to evaporate at least a portion of the solution from the printed layer.

8. The method of claim 1, wherein selectively depositing the solution upon a predetermined portion of the loose metal powder includes selectively depositing the solution upon a predetermined portion of the loose metal powder to create, as a component of the printed layer, a boundary frame around at least a portion of the periphery of a remaining portion of the printed layer.

9. The method of claim 8, including removing at least one of the boundary frame and loose metal powder adjacent to the remaining portion of the dried layer from the remaining portion of at least one dried layer before bulk sintering of the green part.

10. The method of claim 1, including sintering the loose metal powder for the first time as a component of the green part.

11. The method of claim 4, wherein bulk sintering the green part to create a metallic part includes sintering the inorganic salt into ceramic.

12. The method of claim 1, including spreading loose metal powder over an additive manufacturing build tank containing at least a previously created one of a printed layer and a dried layer.

13. The method of claim 1, wherein bulk sintering the green part to create a metallic part includes decomposing an inorganic salt of the solution into ceramic particles.

14. The method of claim 1, wherein bulk sintering the green part to create a metallic part includes melting at least a portion of the loose metal powder to create a metal matrix material forming at least a portion of the metallic part.

* * * * *